US012768820B2

(12) United States Patent
Alnufaili et al.

(10) Patent No.: US 12,768,820 B2
(45) Date of Patent: Oct. 20, 2026

(54) SYSTEM AND METHOD FOR ULTRASONIC TESTING AND WELD INSPECTION

(71) Applicant: SAUDI ARABIAN OIL COMPANY, Dhahran (SA)

(72) Inventors: Muhammed Subhi A. Alnufaili, Dammam (SA); Ali Faraj M. Alqabani, Riyadh (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 582 days.

(21) Appl. No.: 18/057,612

(22) Filed: Nov. 21, 2022

(65) Prior Publication Data

US 2024/0167981 A1 May 23, 2024

(51) Int. Cl.
*G01N 29/265* (2006.01)
*G01N 29/04* (2006.01)

(52) U.S. Cl.
CPC ........... *G01N 29/265* (2013.01); *G01N 29/04* (2013.01); *G01N 2291/0289* (2013.01); *G01N 2291/267* (2013.01)

(58) Field of Classification Search
CPC . G01N 29/265; G01N 29/04; G01N 2291/267
See application file for complete search history.

(56) References Cited

U.S. PATENT DOCUMENTS 5,952,577 A * 9/1999 Passi .................... G01N 29/069 600/445
10,324,066 B1 * 6/2019 Davis .................... G01N 29/48
10,443,787 B2 10/2019 Bovero et al.
2009/0312958 A1 * 12/2009 Dai ...................... B23K 9/0956 702/40
2011/0083512 A1 * 4/2011 Imbert .................. G01N 29/27 73/622
2011/0239770 A1 * 10/2011 Yamano ............... G01N 29/043 73/632

(Continued)

OTHER PUBLICATIONS

Sudevan, Vidya & Shukla, Amit & Karki, Hamad. (2019). Autonomous tracking and tagging of buried pipelines based on Pipe-Locator data.

(Continued)

*Primary Examiner* — Helen C Kwok
(74) *Attorney, Agent, or Firm* — Vorys, Sater, Seymour and Pease LLP

(57) ABSTRACT

System and method are described herein relating to weld inspection. In an example, an ultrasonic inspection system can include a scanning head, an output device, and a weld tracker. The scanning head can be used to position a probe relative to a weld during weld inspection. The scanning head can include a location determination device that can be configured to determine a location for the scanning head that can be an approximate location for the weld during the weld inspection. The weld tracker can be configured to receive the location for the scanning head that can be the approximate location for the weld during the weld and cause the output device to render the approximate location for the weld. In some examples, the ultrasonic inspection system includes an access controller that can control access to using one of the scanning head and weld testing software.

20 Claims, 3 Drawing Sheets

(56) References Cited

U.S. PATENT DOCUMENTS

| | | | | |
|---|---|---|---|---|
| 2014/0272838 | A1* | 9/2014 | Becker | G09B 19/003<br>434/234 |
| 2016/0125592 | A1* | 5/2016 | Becker | B23K 9/126<br>348/90 |
| 2016/0231284 | A1* | 8/2016 | Shiina | G01N 29/043 |
| 2016/0238564 | A1* | 8/2016 | Owens | G01N 29/2412 |
| 2017/0131220 | A1* | 5/2017 | Buelsing | G01N 29/262 |
| 2018/0292357 | A1* | 10/2018 | Leach | G01N 29/262 |
| 2019/0093828 | A1* | 3/2019 | Bovero | F16L 13/0272 |
| 2021/0027658 | A1* | 1/2021 | Becker | G09B 19/24 |
| 2021/0114142 | A1* | 4/2021 | Trigui | G01N 21/954 |
| 2022/0137002 | A1* | 5/2022 | Hamano | G01N 29/26<br>702/39 |
| 2022/0341886 | A1* | 10/2022 | David | G01N 29/225 |
| 2023/0024687 | A1* | 1/2023 | Saito | B23K 11/255 |

OTHER PUBLICATIONS

Pipeliner—Mobile Tracking System for Pipeline Construction retrieved from http://www.datasourceinc.com/products/pipeliner.html; Nov. 21, 2022.

Okoli, Johnson et al.; Autonomous Robot for Gas Pipeline Inspection and Leak Detection; International Journal of Computing and Digital Systems; ISSN (2210-142X); Int. J. Com. Dig. Sys. 11, No. 1 (Feb. 2022).

Accuscan Brochure retrieved from https://autsolutions.net/ndt-products/automated-ndt-scanners/accuscan-automated-corrosion-mapping-tofd-phased-array-scanner-2/; Nov. 21, 2022.

Accutrak Manual retrieved from https://autsolutions.net/ndt-products/automated-ndt-scanners/accutrak/; Nov. 21, 2022.

* cited by examiner

SYSTEM AND METHOD FOR ULTRASONIC TESTING AND WELD INSPECTION

FIELD OF THE DISCLOSURE

This disclosure relates generally to ultrasonic testing (UT), and more particularly, to a system and method for ultrasonic testing (UT) and weld inspection.

BACKGROUND OF THE DISCLOSURE

UT is a branch of nondestructive testing (NDT) techniques that involve emitting high-frequency sound energy, or ultrasonic waves, into an asset for corrosion mapping, obtaining data/measurements, or identifying cracks or defects. Automated ultrasonic testing (AUT) is a family of ultrasonic testing methods that use mechanized means to drive the ultrasonic scanning equipment around a site being tested. AUT can also incorporate computer software that can aid the technician when detecting discontinuities. AUT reduces the ultrasonic inspection time for many different applications.

SUMMARY OF THE DISCLOSURE

Various details of the present disclosure are hereinafter summarized to provide a basic understanding. This summary is not an extensive overview of the disclosure and is neither intended to identify certain elements of the disclosure nor to delineate the scope thereof. Rather, the primary purpose of this summary is to present some concepts of the disclosure in a simplified form prior to the more detailed description that is presented hereinafter.

According to an embodiment, a system can include a scanning head that can be used to position a probe relative to a weld. The scanning head can include a location determination device that can be configured to determine a location for the scanning head that can be an approximate location for the weld during a weld inspection. The system can further include an output device, and a weld tracker that can be configured to receive the location for the scanning head that can be the approximate location for the weld and cause the output device to display the approximate location for the weld.

In another embodiment, a method can include receiving, by one or more processors, location data indicating a location of a scanning head used during weld inspection of a weld. The location of the scanning head can be an approximate location of the weld. The method can include receiving, by the one or more processors, weld data characterizing weld characteristics of the weld during the welding inspection of the weld, storing, by the one or more processors, the weld data and the location data in memory of a computing device, receiving, by the one or more processors, access request data corresponding to a request from a user to access the weld data, and denying or granting access to the weld data in response to determining that the user is one of authorized or not authorized to access the weld data based on an evaluation of the access request data and user data. The user data can identify one or more authorized users permitted to access the weld data.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
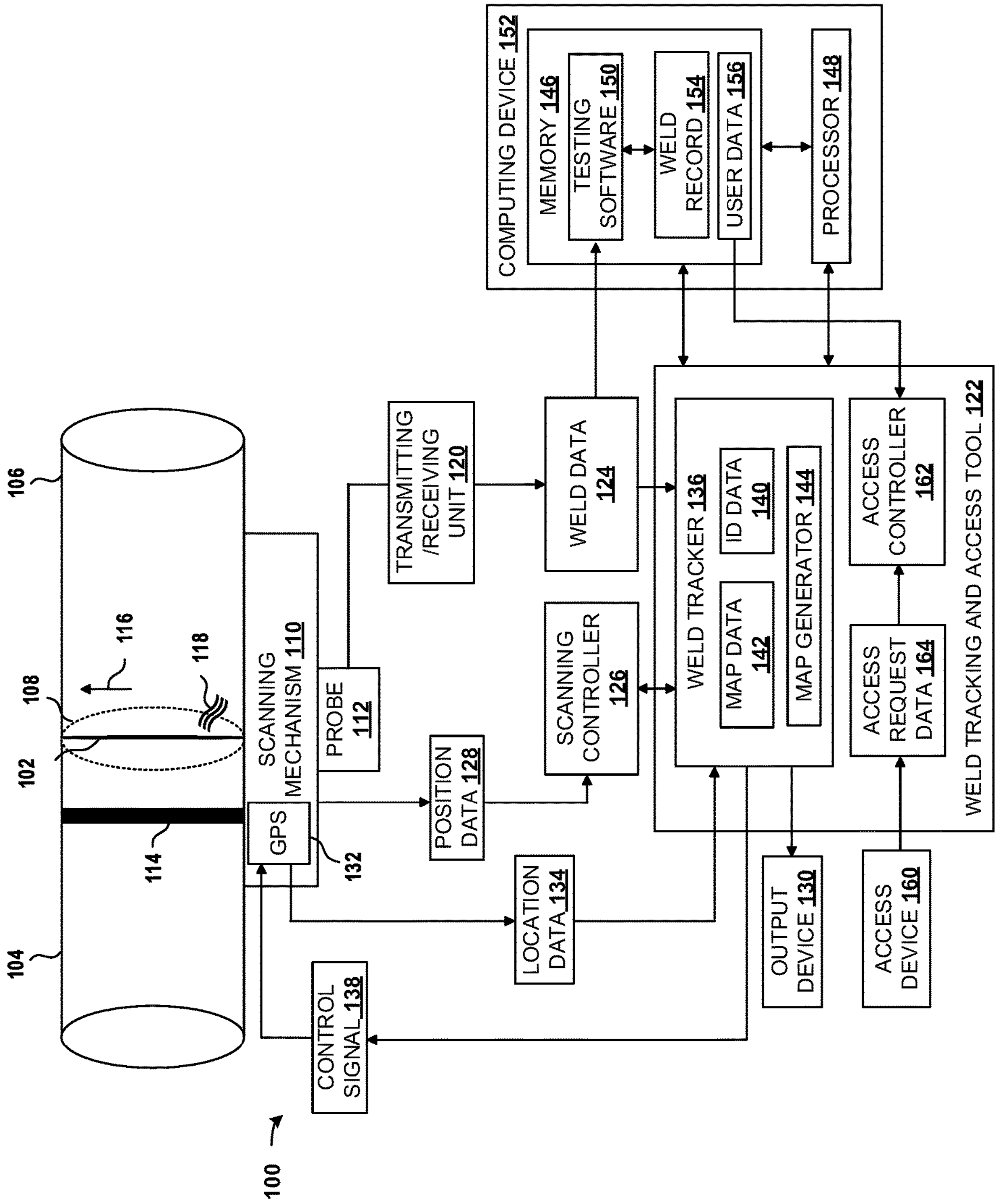
FIG. 1 is an example of a weld inspection system.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to UT. Welding technologies are used in many industries, such as oil and gas. NDT techniques are being used to evaluate welds to determine whether a weld meets guidelines or requirements to comply with safety and reliability criteria. AUT is used to identify internal and/or surface flaws in a surface formed by the weld. AUT allow inspectors to detect weld flaws or irregularities without destroying or affecting an integrity of the weld.

The oil and gas industry utilizes various complex infrastructure such as rigs, pipelines, platforms, plants, and facilities. Welding is used in oil and gas operations both for the construction of new projects and for the maintenance of existing facilities. The oil and gas industry is generally divided into three stages of operation, which can be referred to as sectors, and are upstream, midstream, and downstream. Welding is used across all these sectors. The upstream sector (also known as exploration and production) covers exploration, recovery, and production of crude oil and natural gas. Welding is used in the upstream sector, for example, for the creation of flow and gathering lines, as well as support structures. The midstream sectors covers transportation and storage of extracted crude oil and gas before refining and involves use of transmission pipelines and storage vessels created using welding. The downstream sector relates to refining crude oil in refineries and distributing a refined product. Welding is used in the downstream sector for constructing and maintain refineries, creation of storage and transport vessels for the refined product, and distribution lines for supplying gas, such as to an entity (e.g., a business), or consumer.

Completing a welding project, for example, for oil and/or gas transportation lines, is demanding and requires extensive human resources to ensure that pipes are properly welded and without defects/irregularities to meet regulations or organizational standards. Inspectors are required visit a project site multiple times to inspect weld points (e.g., at which two pipes are welded). Inspectors generally follow an inspection plan, which requires inspectors to visit one or more inspection points to meet quality assurance (QA) requirements. Thus, inspectors (e.g., quality control (QC) and/or QA inspectors) are required to physically visit a weld site to confirm that weld results are actually for a particular weld, and that weld results are authenticate (e.g., have not been forged). However, inspector site visits increase project costs, and pose a risk to the inspector if the inspector has to visit a remote on-shore area, or perform an underwater weld inspection.

Examples are described herein for autonomous QA/QC through weld location tracking and recording of a time when a weld inspection was performed by an authorized welder or operator without the need for QC/QA inspector's physical attendance. According to the examples herein, a weld inspection system is described that provides a cost-effective approach for inspection of welds. In some examples, the weld inspection system is an AUT system and can encompass pulse-echo weld inspection, phased array and Time of Flight Diffraction. The weld inspection system as described herein is equipped with a location determination device and allows QC/QA to use weld location information for a weld to confirm whether the authorized operator actually visited a weld site to perform an UT weld inspection (e.g., a post-weld inspection). The weld inspection system, in some instances, allows QC/QA inspectors to confirm that the authorized operator performed inspection points leading to UT weld inspection. The inspection points can include weld fit-up and pre-welding and in-process welding. In some instances, the weld inspection system includes access control capabilities to restrict access to a computing device and/or a scanning mechanism, as well as weld records for the weld. The weld records can include weld information relating to one or more inspections of the welding process. By restricting access to weld records, forgery of such records can be reduced, and thus ensure to inspectors that weld readings are authentic for a weld.

While examples are presented herein describing a weld inspection system for use in oil or gas industry for weld inspection, the examples herein should not be construed and/or limited to only oil or gas welding. The weld location tracking and/or access control functionality of the weld inspection system as described herein can be used in any industry requiring weld inspection and/or data integrity/authenticity. Moreover, while the examples herein relate to AUT systems, in other examples, the weld location tracking and/or access control functionality, as described herein, can be used as part of a weld inspection system that is based on a different inspection technique (e.g., different NDT technique).

FIG. 1 is an example of a weld inspection system 100. The weld inspection system 100 can be used during a welding process, for example, post-weld inspection. In some instances, the weld inspection system 100 can be used during upstream welding stages of the welding process, as described herein. In the example of FIG. 1, the weld inspection system 100 is used for inspecting a weld (or a weld fusion line) 102 between pipes 104 and 106. For example, the weld inspection system 100 can be used to inspect a pipe girth weld. Respective ends 108 of the pipes 104 and 106 can be welded to form the weld 102, as shown in FIG. 1. The pipes 104 and 106 can be part of an oil or gas infrastructure. For example, the pipes 104 and 106 can correspond to pipes within an upstream sector. Examples are presented herein in which the weld inspection system 100 is used for inspecting a weld between pipes in the upstream sector, however, in other examples, the weld inspection system 100 can be used in other stages of operation, such as upstream and/or downstream sectors of the oil or gas industry, as well as in other industries.

Continuing with the example of FIG. 1, the weld inspection system 100 includes a scanning mechanism or head 110. The scanning mechanism 110 can be used for locating or positioning an ultrasonic probe 112 attached to the scanning mechanism 110 relative to the weld 102 for weld inspection. The scanning mechanism 110 can be attached to a band 114, for example, using clamping. In some examples, the band 114 is a rail. The band 114 can be positioned or located on an outer circumferential side of one of the pipes 104 and 106. In the example of FIG. 1, the band 114 is located on the pipe 104. During the welding inspection, the scanning mechanism 110 can include wheels that can drive the ultrasonic probe 112 in a direction 116 around the weld 102. The scanning mechanism 110 can press the ultrasonic probe 112 toward a weld outer surface formed by the weld 102 and move the ultrasonic probe 112 along the outer surface to inspect the weld 102. The ultrasonic probe 112 can be coupled by a coupling medium to the weld 102 as the ultrasonic probe 112 is passed over the weld outer surface. The coupling medium can include gel, oil, or water. The ultrasonic probe 112 can transmit an ultrasonic wave 118 toward the weld 102 to capture weld characteristics of the weld 102. The weld characteristics can be analyzed to determine whether the weld 102 has any defects, such as surface or internal defects.

In the example of FIG. 1, the ultrasonic probe 112 is connected to a transmitting/receiving unit 120 of the weld inspection system 100. In some examples, the scanning mechanism 110 includes the transmitting/receiving unit 120. The transmitting/receiving unit 120 can include circuitry and/or devices for generating a voltage that can be used by the ultrasonic probe 112 for generating the ultrasonic wave 118. In some examples, the ultrasonic probe 112 is an array probe, and the transmitting/receiving unit 120 can includes a pulsar for generating triggers signals. The trigger signals can be provided to the array probe to transmit ultrasonic waves (e.g., using, for example, piezoelectric elements) at timings different from each other, and receive ultrasonic response waves, which can be processed to determine the weld characteristics of the weld 102.

The transmitting/receiving unit 120 can also includes circuitry and/or devices for receiving a reflection of the ultrasonic wave 118, which can be provided ultrasonic data referred to herein as weld data 124. In some examples, weld tracking and access (WTA) tool 122 can receive the weld data 124. As described herein, the scanning mechanism 110 can cause the ultrasonic probe 112 to scan the weld 102. The scanning can include one-dimensional or two-dimensional scanning. The scanning mechanism 110 can communicate with a scanning controller 126. While in the example of FIG. 1 the WTA tool 122 includes the scanning controller 126, in other examples, the scanning controller 126 can be implemented as a stand-alone element (e.g., module, device, apparatus, etc.). The scanning controller 126 can control the scanning mechanism 110. For example, the scanning controller 126 can control an area to be scanned, and a position at which the scanning is performed during the weld inspection. The scanning controller 126, in some instances, controls a position of the ultrasonic probe 112 relative to the weld 102.

The scanning mechanism 110 can provide position data 128 on the position of the scanning mechanism 110 and/or the position of the ultrasonic probe 112 at which the scanning is performed. The scanning mechanism 110 can include one or more position sensors for determining the position of the scanning mechanism 110 and/or the position of the ultrasonic probe 112. The WTA tool 122 can combine, store, and display the position data 128 and the weld data 124 on an output device 130, in some instances. In other examples, weld testing software 150, such as described herein, can be used for combining, storing, and displaying of the position data 128 and the weld data 124 on the output device 130. The output device 130 can include a display, smart glasses, or a head mounted display. In some examples, the output device 130 is a portable device, for example, a mobile device, a personal digital assistant (PDA), or a portable computing device (e.g., a tablet, or the like).

The scanning mechanism 110 can be equipped with a location determination device, such as a global positioning system (GPS) receiver 132. While the example of FIG. 1 illustrates the scanning mechanism 110 being equipped with a GPS device, in other examples, a different type of location determination or geo-location device can be used (e.g., Enhanced Observed Time Difference (E-OTD), Enhanced GPS (E-GPS), Wi-Fi, Bluetooth (e.g., Bluetooth Low Energy (BLE), such as BLE beacons, and/or BLE gateways), network-based geolocation devices, or any type of geolocation device capable of identifying a geographic location of a device). In some instances, the GPS receiver 132 is a dual-band GPS receiver. Generally, a manufactured pipe length is about 12 meters (or 40 feet), or in some cases 6 meters (or 20 feet). In certain embodiments, the GPS receiver 132 is accurate to about 3 meters, such that welds for manufactured pipes can be readily identified from adjacent welds, or weld joints. In other embodiments, the GPS receiver 132 is accurate to less than 3 meters, and can be used in implementations wherein distance between weld joints is less than a pipe length (e.g., less than 6 or 12 meters). Thus, the GPS receiver 132 can have a GPS accuracy relative to an actual position/location of the GPS receiver that can be based on a welding map. The welding map can specify welding locations across pipelines and spacing between welds for the pipelines. For example, if the welding map specifies a distance between neighboring welds that is less than the pipe length, a GPS receiver can be used as the GPS receiver 132 that is accurate to less than 3 meters.

The GPS receiver 132 can be used to provide location data 134 for the scanning mechanism 110. Because the scanning mechanism 110 is equipped with the GPS receiver 132, a location of the scanning mechanism 110 can be determined. Thus, the GPS receiver 132 can be used to provide GPS coordinates for the scanning mechanism 110. During weld inspection, the location of the scanning mechanism 110 can be used as an approximate location for the weld 102 based on the location data 134. For example, during weld inspection, the GPS receiver 132 can be activated to provide the location data 134. The location data 134 can include location and timing information for the weld 102. The timing information can indicate a date and time that the GPS receiver 132 was activated, which can correspond to a date and time at which the weld 102 was inspected. The location information can include GPS coordinates for the scanning mechanism 110, which as described herein can correspond to an approximate location for the weld 102.

The WTA tool 122 includes a weld tracker 136. The weld tracker 136 can be used to provide a control signal 138 to activate the GPS receiver 132. In some instances, the weld tracker 136 communicates with the scanning controller 126 to cause the scanning controller 126 to provide the control signal 138. In some examples, the weld tracker 136 can provide the control signal 138 based on weld identification (ID) data 140. For example, the weld ID data 140 can identify the weld 102 corresponding to an indication that the weld 102 is being inspected, and in some instances can be generated by the weld testing software 150. The weld ID data 140 can be processed by the weld tracker 136 to provide the control signal 138 to receive the approximate location for the weld 102 based on the location data 134.

Thus, as each weld is being inspected by an authorized or weld inspector, the weld tracker 136 can use corresponding weld ID data for retrieving an approximate location for a weld under inspection. The weld tracker 136 can process the location data 134 for the weld 102 and render on the output device 130 the approximate location for the weld 102 and a time at which the weld 102 was inspected, or tested. For example, the weld tracker 136 can communicate with a geographic information system (GIS) or a different type of map system to retrieve map data 142 for a geographical region or area in which the weld 102 is located. The weld tracker 136 can overlay the approximate location for the weld 102 on a map of the geographical region. The weld tracker 136 can include a map generator 144 that can be programmed to output a graphical map with a graphical element at a location on the graphical map corresponding to the approximate location for the weld 102. In some instances, the graphical map can include a time at which the weld 102 was inspected, which can be positioned in relative proximity of the graphical element.

In the example of FIG. 1, the WTA tool 122, the scanning controller 126, and the scanning mechanism 110 can communicate over a connection medium. The connection medium can include any combination of wired and/or wireless connections, and/or network interfaces to provide a pathway for communication between the WTA tool 122, the scanning controller 126, and the scanning mechanism 110. The connection medium may be a tangible medium, such as a wire or a fiber optic cable, or an intangible medium, such as a radio wave for wireless communication. The WTA tool 122 can be implemented using one or more modules, shown in block form in the drawings. The one or more modules can be in software or hardware form, or a combination thereof. In some examples, the WTA tool 122 can be implemented as machine readable instructions that can be stored in a memory 146, as shown in FIG. 1.

A processor 148 can access the memory 146 and execute the machine readable instructions to implement at least some of the functions, as described herein. By way of example, the memory 146 can be implemented, for example, as a non-transitory computer storage medium, such as volatile memory (e.g., random access memory (RAM), such as DRAM), non-volatile memory (e.g., a hard disk drive, a solid-state drive, a flash memory, or the like), or a combination thereof. The processor 148 can be implemented, for example, as one or more processor cores. In some examples, the WTA tool 122 can be implemented as a software plugin and incorporated into a computer program (e.g., into a software application). As an example, the computer program can correspond to the weld testing software 150, as shown in FIG. 1. The weld testing software 150 can include one or more different types of weld analysis functions, and/or other types of weld functions. In some examples, the weld testing software 150 can control operations of the scanning controller and/or scanning mechanism 110 to initiates and/or implement weld inspection of the weld 102.

In some examples, the weld testing software 150 can include UT or AUT testing functionality. The weld testing software 150 can implement one or more of the weld analysis functions based on the weld data 124. In some examples, the WTA tool 122 and/or the scanning controller 126 can be implemented on a same or different computing device 152, such as a desktop computer, workstation computer, server, laptop, tablet computer, mobile telephone, or any other type of stationary or portable computing device, or dedicated device. The computing device 152 can include the memory 146 and the processor 148, as shown in FIG. 1.

The weld data 124 can be stored in the memory 146. For example, the weld data 124 can be stored as part of a weld record 154. For example, the weld testing software 150 can stored the weld data 124 as part of the weld record 154. The weld record 154 can identify a number of different welds (e.g., for a pipeline) and can include corresponding weld data. The weld record 154 in some instances can include weld evaluation or processing for welds from different welding stages. The weld evaluation or processing data can include data from the upstream welding stages of the welding process, such as weld fit-up and pre-welding and in-process welding inspection. Thus, in some instances, the weld record 154 can include location data and weld data for welds from other welding stages. In further examples, the location data 134 can be stored as part of the weld record 154. Thus, in some instance, the graphical map can be generated based on the weld record 154.

In some examples, the memory 146 can include user data 156 identifying a user of the weld inspection system 100. For example, the user can correspond to an authorized or approved operator/weld inspector of the computing device 152 and/or the scanning mechanism 110, and thus the weld inspection system 100. The user data 156 can identify credentials (e.g., a password, a key code, etc.) for the approved operator, or biometric readings of the operator, which as described herein can be used for controlling access to the computing device 152 and/or the scanning mechanism 110.

In additional or alternative examples, the WTA tool 122 includes an access device 160 for controlling access to the weld inspection system 100. The access device 160 can be used to limit use of the computing device 152 and/or the scanning mechanism 110 to authorized personnel, and thus protect the weld record 154 or the weld data 124 from manipulation, and thus forgery. As such, the access device 160 can prevent unauthorized users from using the computing device 152 to access the weld record 154; in instances, this information is stored locally on the computing device 152. In other examples, the weld record 154 can be stored on a different device, or in a cloud-computing environment, which communicates with the computing device 152. By limiting access to the weld record 154 reduces forgery of weld data results and insures to a QC/QA that weld readings or measurements is authentic weld data for the weld 102. In some examples, the access device 160 is a biometric scanner (e.g., a fingerprint reader), in other examples, the access device is a keypad. The keypad can be implemented as physical or a digital keypad. In examples wherein the keypad is a digital keypad, the keypad can be rendered on the output device 130 as an interactive keypad.

The WTA tool 122 includes an access controller 162. The access controller 162 can receive access request data 164. The access device 160 can output the access request data 164. In some instances, the access request data 164 includes biometric readings for a user requesting access to use the weld testing software 150 and/or the scanning mechanism 110. In other examples, the access request data 164 includes a key code or password provided at the access device 160 by a requesting user. The access controller 162 can process the access request data 164 to determine whether the requesting user should be granted access to the weld testing software 150 and/or the scanning mechanism 110. The user can be granted access to the scanning controller 126 to initiate a weld inspection in response to being granted access to the scanning mechanism 110. In some examples, the requesting user can be denied access to the weld testing software 150 in response to determining that the user is not authorized to access the weld testing software 150 based on an evaluation of the access request data 164 and user data 156, which can identify one or more authorized users. By denying access to unauthorized users, the access controller 162 can protect the weld data from being accessed by malicious actors. For example, the access controller 162 can compare the access request data 164 to the user data 156 to determine whether the request user is one of the authorized users identified by the user data 156.

Accordingly, the weld inspection system 100 can be equipped with GPS location tracking functionality. This allows QC/QA to use weld location information for a weld to confirm whether the authorized operator actually visited a weld site to perform an UT weld inspection (e.g., a post-weld inspection), and in some instances, that inspection points leading to UT weld inspection were performed by the authorized operator. In some instances, as described herein, the weld inspection system 100 can be equipped with access control capabilities to restrict access to the computing device 152, thereby the weld testing software 150, and/or the scanning mechanism 110, as well as weld records for the weld. The weld records can include weld information relating to one or more inspections of the welding process. By restricting access to weld records, forgery of such records can be reduced, and thus ensure to inspectors that weld readings are authentic for the weld 102.

Figure 2:
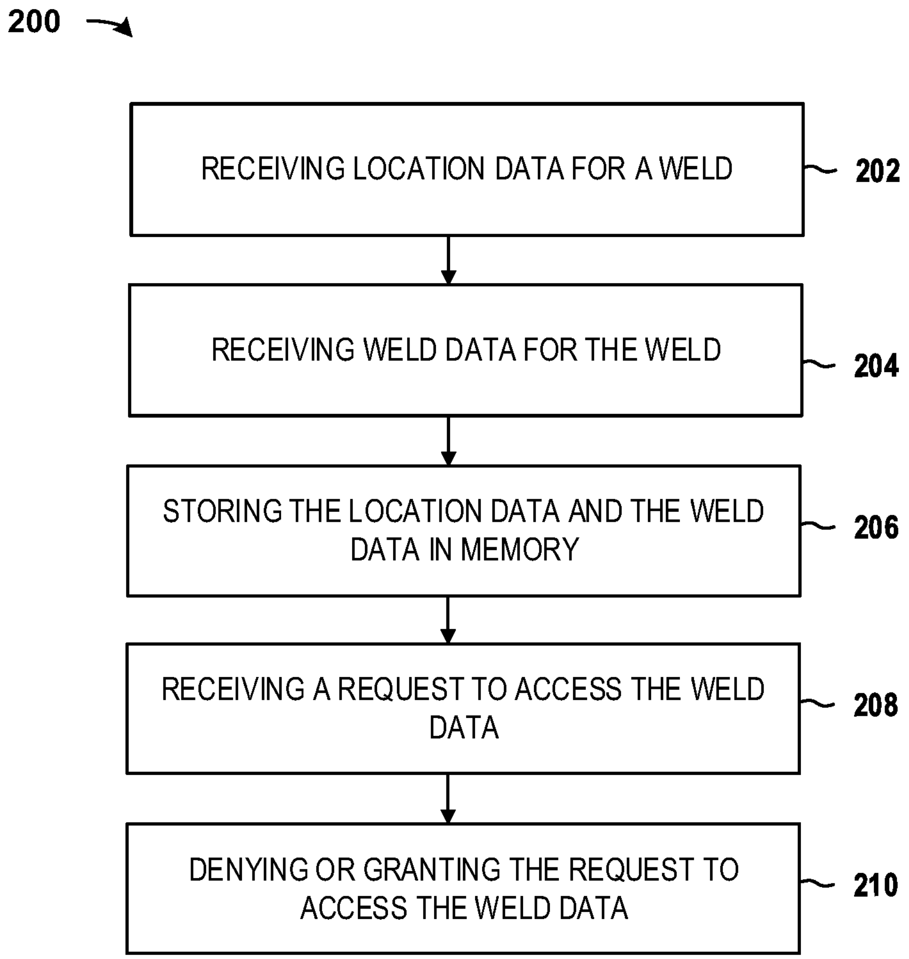
FIG. 2 is an example of a method for weld location tracking and controlling access to weld data for a weld.

In view of the foregoing structural and functional features described above, an example method will be better appreciated with reference to FIG. 2. While, for purposes of simplicity of explanation, the example method of FIG. 2 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the method.

FIG. 2 is an example of a method 200 for weld location tracking and controlling access to weld data for a weld (e.g., the weld 102, as shown in FIG. 1). The method 200 can be implemented by the processor 148, and thus by the WTA tool 122, as shown in FIG. 1. Thus, reference be made to the example of FIG. 1 in the example of FIG. 2. The method 200 can begin at 202 by receiving location data (e.g., the location data 134, as shown in FIG. 1) indicating a location of a scanning head (e.g., the scanning mechanism) 110, as shown in FIG. 1) used during weld inspection of the weld. The location of the scanning head can be an approximate location of the weld.

At 204, receiving weld data (e.g., the weld data 124, as shown in FIG. 1) characterizing weld characteristics of the weld during the welding inspection of the weld. At 206, storing the weld data and the location data in a memory (e.g., the memory 146, as shown in FIG. 1) of a computing device (e.g., the computing device 152, as shown in FIG. 1). At 208, receiving access request data (e.g., the access request data 164, as shown in FIG. 1) corresponding to a request from a user to access the weld data. At 210, denying or granting access to the weld data in response to determining that the user is one of authorized or not authorized to access the weld data based on an evaluation of the access request data and user data (e.g., the user data 156, as shown in FIG. 1). The user data can identify one or more authorized users permitted to access the weld data.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 3. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 3:
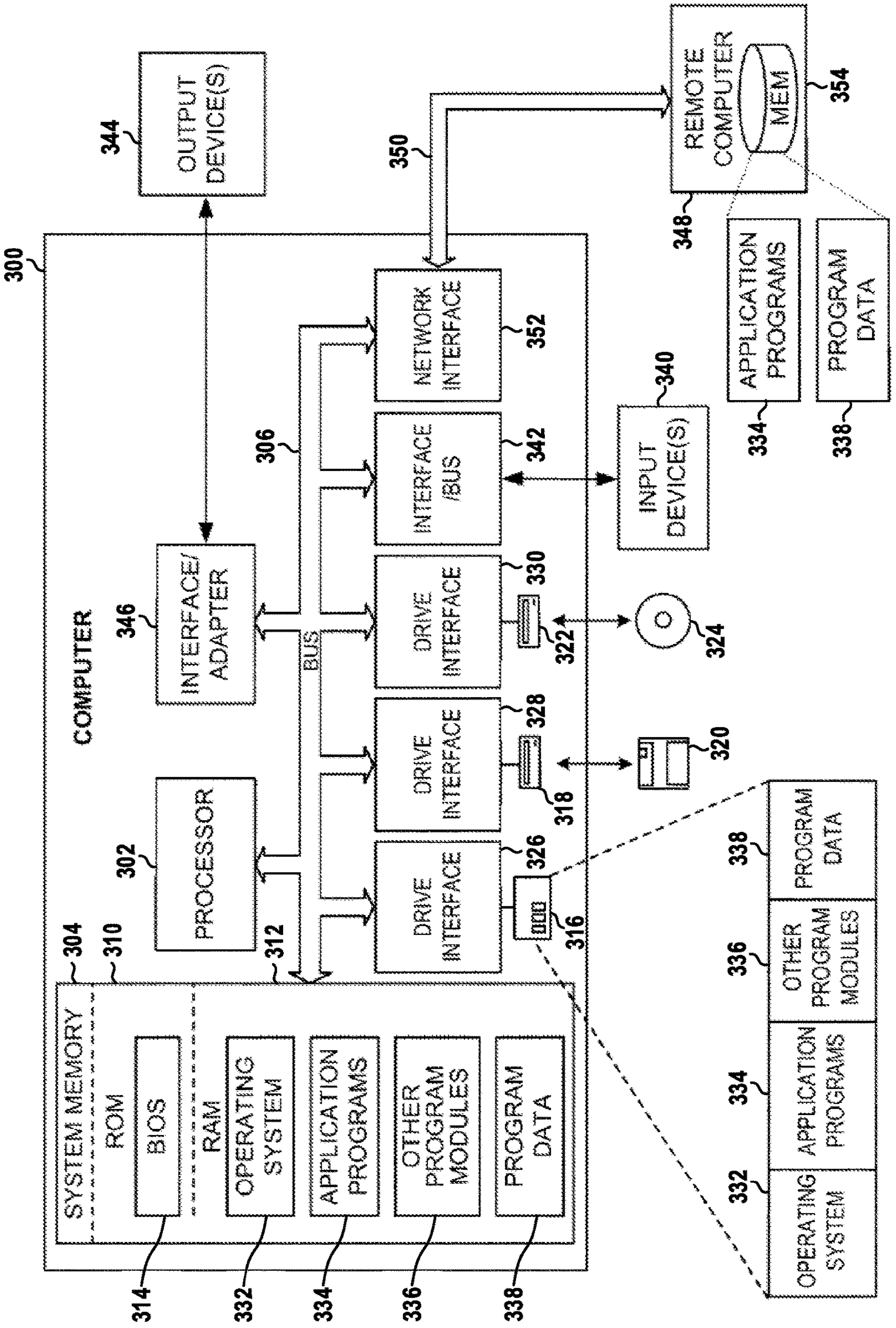
FIG. 3 depicts an example computing environment that can be used to perform methods according to an aspect of the present disclosure.

In this regard, FIG. 3 illustrates one example of a computer system 300 that can be employed to execute one or more embodiments of the present disclosure. Computer system 300 can be implemented on one or more general purpose networked computer systems, embedded computer systems, routers, switches, server devices, client devices, various intermediate devices/nodes or standalone computer systems. Additionally, computer system 300 can be implemented on various mobile clients such as, for example, a personal digital assistant (PDA), laptop computer, pager, and the like, provided it includes sufficient processing capabilities.

Computer system 300 includes processing unit 302, system memory 304, and system bus 306 that couples various system components, including the system memory 304, to processing unit 302. Dual microprocessors and other multi-processor architectures also can be used as processing unit 302. System bus 306 may be any of several types of bus structure including a memory bus or memory controller, a peripheral bus, and a local bus using any of a variety of bus architectures. System memory 304 includes read only memory (ROM) 310 and random access memory (RAM) 312. A basic input/output system (BIOS) 314 can reside in ROM 310 containing the basic routines that help to transfer information among elements within computer system 300.

Computer system 300 can include a hard disk drive 316, magnetic disk drive 318, e.g., to read from or write to removable disk 320, and an optical disk drive 322, e.g., for reading CD-ROM disk 324 or to read from or write to other optical media. Hard disk drive 316, magnetic disk drive 318, and optical disk drive 322 are connected to system bus 306 by a hard disk drive interface 326, a magnetic disk drive interface 328, and an optical drive interface 330, respectively. The drives and associated computer-readable media provide nonvolatile storage of data, data structures, and computer-executable instructions for computer system 300. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein. A number of program modules may be stored in drives and RAM 310, including operating system 332, one or more application programs 334, other program modules 336, and program data 338. In some examples, the application programs 334 can include the WTA tool 122, and the weld testing software 150, as shown in FIG. 1.

A user may enter commands and information into computer system 300 through one or more input devices 340, such as a pointing device (e.g., a mouse, touch screen), keyboard, microphone, joystick, game pad, scanner, and the like. These and other input devices are often connected to processing unit 302 through a corresponding port interface 342 that is coupled to the system bus, but may be connected by other interfaces, such as a parallel port, serial port, or universal serial bus (USB). One or more output devices 344 (e.g., display, a monitor, printer, projector, or other type of displaying device) is also connected to system bus 306 via interface 346, such as a video adapter. In some examples, a respective output device (e.g., the output device 130, as shown in FIG. 1) of the one or more output devices 344 can be used for displaying the location data 134, as shown in FIG. 1, or geographical maps with location and/or timing information for the weld 102.

Computer system 300 may operate in a networked environment using logical connections to one or more remote computers, such as remote computer 348. Remote computer 348 may be a workstation, computer system, router, peer device, or other common network node, and typically includes many or all the elements described relative to computer system 300. The logical connections, schematically indicated at 350, can include a local area network (LAN) and a wide area network (WAN). When used in a LAN networking environment, computer system 300 can be connected to the local network through a network interface or adapter 352. When used in a WAN networking environment, computer system 300 can include a modem, or can be connected to a communications server on the LAN. The modem, which may be internal or external, can be connected to system bus 306 via an appropriate port interface. In a networked environment, application programs 334 or program data 338 depicted relative to computer system 300, or portions thereof, may be stored in a remote memory storage device 354.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

The invention claimed is:

1. A system comprising:

a scanning head for positioning an array probe relative to a weld between a plurality of pipes to perform a weld inspection of the weld, wherein the scanning head is located outside of the plurality of pipes, and includes a global positioning system (GPS) receiver configured to determine location data for the weld during the weld inspection, the location data including a location for the scanning head that is an approximate location for the weld during the weld inspection, wherein the array probe is configured to direct a set of ultrasonic waves to the plurality of pipes in response to one or more trigger signals, the set of ultrasonic waves used to generate weld data about the weld;

a weld record storing the weld data and the location data for each performed weld inspection;

an output device;

a weld tracker configured to render the location data on the output device; and an access controller preventing initiation of the weld inspection with the scanning head until receipt of access request data from an authorized user.

2. The system of claim 1, wherein the weld tracker is configured to generate a graphical map with a graphical element at a location corresponding to the approximate location for the weld on the graphical map, the graphical map being representative of a geographical area that includes the weld.

3. The system of claim 2, wherein the weld tracker includes a map generator configured to generate the graphical map based on map data for the geographical area that includes the weld and the location data.

4. The system of claim 2, wherein the weld tracker is configured to provide a control signal to the GPS receiver to cause the GPS receiver to output the location data.

5. The system of claim 4, wherein the weld tracker is configured to provide the control signal based on weld identification (ID) data, the weld ID data identifying the weld and corresponds to an indication that the weld is being inspected.

6. The system of claim 5, further comprising a computing device with memory that stores the weld record.

7. The system of claim 6, wherein the memory further comprises weld testing software for processing the weld data for determining whether the weld is acceptable or not acceptable.

8. The system of claim 1, wherein the access request data is generated by an access device in response to a user interaction with the access device, the access device comprising at least one of a biometric scanner or a keypad.

9. The system of claim 7, wherein the memory includes machine-readable instructions representative of a weld tracking and access tool that includes the weld tracker and the access controller, and weld testing software, and wherein the weld tracking and access tool is implemented as a software plugin and incorporated into the weld testing software.

10. A method comprising:

placing a scanning head of a weld inspection system around an exterior of two pipes adjoined by a weld;

receiving, at an access controller of the weld inspection system, access request data corresponding to a request from a user to access the weld inspection system;

granting access to the weld inspection system in response to the access controller determining that the user is authorized based on an evaluation of the access request data and user data, the user data identifying one or more authorized users permitted to operate the weld inspection system;

initiating a weld inspection operation of the weld using the weld inspection system after granting access to the user with the access controller;

receiving, by one or more processors, location data indicating a location of the scanning head during the weld inspection operation, the location of the scanning head being an approximate location of the weld;

receiving, by the one or more processors, weld data characterizing weld characteristics of the weld during the weld inspection operation, the weld data generated from a set of ultrasonic waves directed towards the pipes by an array probe, wherein the set of ultrasonic waves are generated in response to one or more trigger signals; and storing, by the one or more processors, the weld data and the location data in a memory of a computing device.

11. The method of claim 10, further comprising causing, by the one or more processors, to display the approximate location for the weld on an output device.

12. The method of claim 11, further comprising causing, by the one or more processors, to provide a control signal during the weld inspection to a global positioning system (GPS) receiver to cause the GPS receiver to provide the location data.

13. The system of claim 1, wherein directing the set of ultrasonic waves to the plurality of pipes is performed via one or more piezoelectric elements.

14. The system of claim 1, wherein, based on the one or more trigger signals, the array probe is configured to direct a second set of ultrasonic waves to the plurality of pipes, the second set of ultrasonic waves occurring after the set of ultrasonic waves.

15. The system of claim 1, wherein the weld data is generated based on reflection information associated with the set of ultrasonic waves.

16. The system of claim 1, wherein the location data includes a date and time obtained by the GPS receiver when the weld inspection occurred.

17. The system of claim 1, wherein the access controller is further configured to grant the authorized user access to the weld record.

18. The system of claim 1, wherein the access controller restricts access to the weld record in response to determining that the access request data does not correspond with an authorized user.

19. The system of claim 7, wherein the access controller is further configured to grant the authorized user access to the weld testing software and the weld record.

20. The method of claim 10, wherein the location data includes a date and time obtained by the GPS receiver when the weld inspection occurred.

* * * * *